United States Patent
Behrens

(10) Patent No.: US 7,334,376 B1
(45) Date of Patent: Feb. 26, 2008

(54) STRIPLIKE BODY OF VEGETATION FOR COVERING ROOFS WITH THIN LAYERS OF VEGETATION

(76) Inventor: Wolfgang Behrens, Trespenmoor 1, D-27243 Gross Ippener (DE)

( * ) Notice: Subject to any disclaimer, the term of this patent is extended or adjusted under 35 U.S.C. 154(b) by 0 days.

(21) Appl. No.: 09/980,608

(22) PCT Filed: Apr. 28, 2000

(86) PCT No.: PCT/DE00/01386

§ 371 (c)(1),
(2), (4) Date: Nov. 2, 2001

(87) PCT Pub. No.: WO01/06837

PCT Pub. Date: Feb. 1, 2001

(30) Foreign Application Priority Data

Jul. 21, 1999 (DE) ............................... 199 34 203

(51) Int. Cl.
*E04B 1/00* (2006.01)
*E04B 7/02* (2006.01)
*E04B 5/00* (2006.01)
*E04G 21/00* (2006.01)
*E04G 23/00* (2006.01)
*A01G 9/02* (2006.01)
*A01G 17/06* (2006.01)
*A01G 17/14* (2006.01)
*A01C 1/04* (2006.01)

(52) U.S. Cl. ..................... 52/746.11; 52/90.1; 52/90.2; 52/408; 52/169.1; 52/750; 47/66.7; 47/47; 47/56

(58) Field of Classification Search ............ 52/18, 52/90, 309.1, 408, 410, 169.1, 169.6, 750, 52/90.1, 90.2, 746.11; 47/79, 66, 56, 47, 47/39, 66.1, 66.7; 119/15, 15 R See application file for complete search history.

(56) References Cited

U.S. PATENT DOCUMENTS

| 4,078,346 | A | * | 3/1978 | Mann ......................... 52/169.4 |
| 4,232,481 | A | * | 11/1980 | Chamoulaud .................. 47/56 |
| 4,336,674 | A | * | 6/1982 | Weber ........................ 52/169.6 |
| 4,534,142 | A | * | 8/1985 | Drefahl ...................... 52/90.2 |
| 4,590,721 | A | * | 5/1986 | Berg et al. ................. 52/169.1 |
| 4,805,367 | A | * | 2/1989 | Kleckner ..................... 52/408 |
| 4,941,282 | A | * | 7/1990 | Milstein ........................ 47/56 |
| 5,077,935 | A | * | 1/1992 | Stoever et al. .................. 47/9 |
| 5,205,068 | A | * | 4/1993 | Solomou ........................ 47/56 |

(Continued)

FOREIGN PATENT DOCUMENTS

| DE | 7511477 | 8/1975 |
| DE | 34 08 698 | 9/1985 |
| DE | 197 40 682 | 4/1999 |
| DE | 19740682 A1 * | 4/1999 |
| EP | 0 047 365 | 3/1982 |

*Primary Examiner*—Richard E. Chilcot, Jr.
*Assistant Examiner*—Hunter M Dreidame
(74) *Attorney, Agent, or Firm*—Collard & Roe, P.C.

(57) ABSTRACT

A striplike body of vegetation which is used to cover roofs with thin layers of vegetation. The inventive body of vegetation is comprised of structural matting arranged on at least one base. The structural matting can be filled with a substrate and germinative plant material, especially seeds, shoots, spores or parts of shoots. The base consists of a feltlike nonwoven material which is only slightly permeable with respect to wind but which has a substantial water storage capacity. According to the invention, the striplike body of vegetation is characterised in that at least the base is permeable with respect to wind as a result of the introduction of holes.

12 Claims, 1 Drawing Sheet

U.S. PATENT DOCUMENTS

| | | | |
|---|---|---|---|
| 5,301,466 A * | 4/1994 | Egan | 47/1.01 F |
| 5,507,845 A * | 4/1996 | Molnar et al. | 47/1.01 R |
| 5,608,989 A * | 3/1997 | Behrens | 47/65.9 |
| 5,802,763 A * | 9/1998 | Milstein | 47/56 |
| 5,887,382 A * | 3/1999 | Marshall et al. | 47/56 |
| 5,981,030 A * | 11/1999 | Haupt et al. | 428/143 |
| 6,219,965 B1 * | 4/2001 | Ishikawa et al. | 47/58.1 R |
| 6,862,842 B2 * | 3/2005 | Mischo | 47/65.9 |
| 7,204,057 B2 * | 4/2007 | Behrens | 47/65.9 |

* cited by examiner

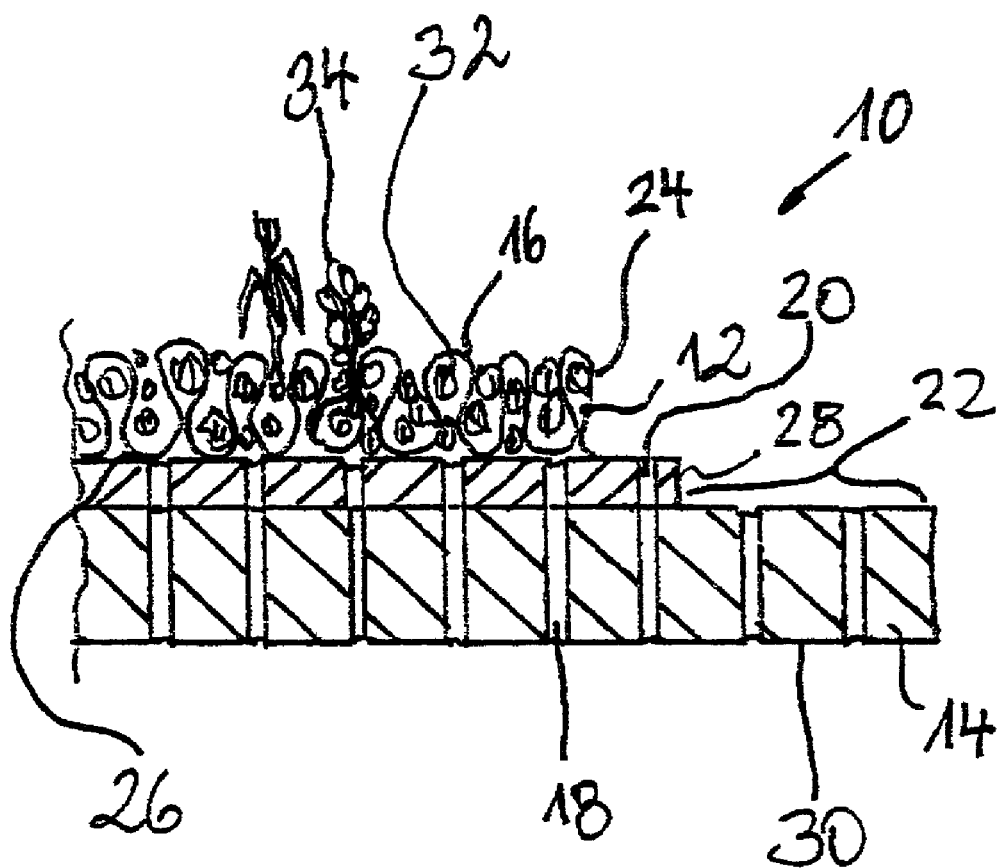

STRIPLIKE BODY OF VEGETATION FOR COVERING ROOFS WITH THIN LAYERS OF VEGETATION

CROSS REFERENCE TO RELATED APPLICATIONS

Applicants claim priority under 35 U.S.C. §119 of GERMANY Application No. 199 34 203.2 filed on Jul. 21, 1999. Applicants also claim priority under 35 U.S.C. §120 of PCT/DE00/01386 filed on Apr. 28, 2000. The international application under PCT article 21(2) was not published in English.

The invention relates to a striplike body of vegetation used to cover roofs with thin layers of vegetation in accordance with the preamble of patent claim 1, and further relates to a process for the manufacture of such a body of vegetation.

The concept of striplike bodies of vegetation used to cover roofs with thin layers of vegetation, such as are known, for example, from DE 197 40 682 A1, is understood to mean mat-type vegetation carriers, which feature structural matting arranged on an underlay. Such bodies of vegetation are relatively thin and, by contrast with conventional substrate designs, combine several functions within them.

The structural matting serves to accommodate the substrate and roots of the plants, whereby the structural matting is intended to secure the hold of the substrate and the plants. The underlay, applied to the underside in the form of a feltlike non-woven material serves to store water. The usual layer thickness of such bodies of vegetation is about 1 to 5 cm. Advantageous with these bodies of vegetation for covering roofs with thin layers of vegetation is the fact that they are relatively light, as a result of which the roof loading is increased to only some 30 kg per square meter, while by contrast substrate structures incur an increased roof loading of more than 80 kg/m$^2$.

At the same time, however, the low weight of such bodies of vegetation is problematic, since such bodies of vegetation on roofs with a height of more than eight meters are subjected to critical wind suction, which leads to the mats being sucked up and raised by the wind suction forces. This leads to suction peaks due to the buoyancy of the bodies of vegetation, which impose a burden on the bodies of vegetation themselves, the foliation, and the root structure.

It has already been proposed in DE 197 40 682 A1 that the wind forces be countered by several striplike bodies of vegetation being laid overlapping, as a result of which the situation is achieved in which the roots of plants root through two overlapping bodies of vegetation and the bodies of vegetation are connected at the side edges. Such an arrangement results in a situation in which the wind can no longer flow beneath the bodies of vegetation. Nevertheless, even mats of this type cannot counteract the wind suction forces which arise on the upper side, since the thick, feltlike underlay functions like an almost impermeable membrane, which can be sucked up by the wind suction forces.

It has already been proposed that the wind suction forces be counteracted by the bodies of vegetation being provided with a scattered layer of gravel and thereby stabilised. This gravel burden for securing the position of the bodies of vegetation, however, increases the load burden on the roof to an undesirable degree, which should be kept as low as possible. Hitherto the increase in the roof loading by scattering gravel to secure the position of such bodies of vegetation was the only feasible method, since it was always taken as the basic principle that a body of vegetation is secure in its position if the resultant wind load, which exerts a raising effect, is smaller than the surface weight of the vegetation mats. Accordingly, with higher wind loads, the surface weight of the vegetation mats was increased. Hitherto no other procedure was possible, since, because of the high flow resistance when wind flows through the bodies of vegetation, the surface permeability is comparatively low.

The inventor has therefore taken as the problem the creating of a body of vegetation of the type referred to in the preamble, which, while maintaining low surface weight and retaining the functions of such bodies of vegetation, is also secure in its position, i.e. insensitive to wind suction even at great roof heights.

This problem is resolved by a striplike body of vegetation in accordance with the preamble to patent claim 1, which presents the features of the characterisation part of patent claim 1.

According to the invention, a striplike body of vegetation for covering roofs with thin layers of vegetation is characterised in that at least the underlay is markedly improved with regard to wind permeability by the application of holes.

In a surprisingly simple manner, the effect is achieved with the holes that no surfaces are offered any longer to the wind suction, since, as a result of the holes, the otherwise closed underside is interrupted or opened, so that an immediate equalization of pressure occurs between top side and underside. This, then, simulates an effect which is otherwise only found with conventional heavy substrate formats, since in that case the substrate particles cause a large number of pores or openings to be present, as a result of which such structures behave in a neutral manner towards wind suction. If the underlay is now provided with holes, the body of vegetation as a whole no longer provides any resistance surface to the wind, and therefore there is no longer any raising of the body of vegetation.

In experimental trials ir has been found, with measurements based on DIN 1055 Part 4, that with different wind dynamic pressure values at the altitude ranges from 0 m to 8 m and 8 m to 20 m, with a dynamic pressure q, in a range from 0.5 to 0.8 kN/m$^2$, bodies of vegetation provided with holes were secure in their position which featured a weight of less than 40 kg/m$^2$.

A further advantageous effect which can be specifically achieved by the holes is that the draining effect of the underlay can be improved by the holes, without the water storage capacity of the underlay being significantly reduced. The underlay is intended not only to be able to store water, in particular in dry periods, but should also be in a position to allow surplus water to run off, with a corresponding gradient, since otherwise the gas exchange of the roots of the plants could become critical. As a result of the holes the air content of the underlay is also improved, and better rooting of the plants in the layer structure beneath the underlay is achieved.

In advantageous embodiments of the invention, provision can be made for the underlay to feature a weight from 30 to 3,500 g/m$^2$, for the bodies of vegetation to be provided with 50 to 1,500 holes per square meter, whereby the holes feature a diameter from 2 to 20 mm, and for the number of holes to be selected as a function of the roof height. With known wind loadings, the permeability value can be calculated.

In practical embodiments of the invention, provision can be made for the structural matting to be a looped mat or a fibre mat, in particular a fibre mat made of coconut fibres, and for the underlay to be a dense needle non-woven material, a polyester non-woven, a polypropylene non-woven, a dense cotton non-woven, or a rock wool mat.

Provision may further be made for reinforcement to be arranged between the structural matting and underlay, to accommodate the tensile forces. Such reinforcement, such as lattice mesh, for example, thin but stable polyester nonwovens, and other feasible materials, serve to accommodate the tensile forces incurred when the body of vegetation is laid on a roof with a pitch of greater than 10°, which neither the structural matting nor the underlay are in a position to do.

In a further practical embodiment, provision is made for the structural matting to be arranged on the underlay in such a way that a first side edge area of the structural matting projects over the first side edge of the underlay, that an opposed second side edge area of the underlay projects beneath a second side edge of the structural matting, so that structural matting and underlay of adjacent bodies of vegetation overlap one another in each case, and that the mutually-overlapping areas in the cultivated state of the bodies of vegetation are connected to one another as a consequence of the root penetration activity of the plants.

In this situation, the advantages of the body of vegetation according to the invention are combined in an advantageous manner with those of a body of vegetation known from DE 197 40 682 A1, with the result that a body of vegetation designed in this manner is not only positionally secure, but is also insensitive to dry shrinkage.

With a process for the manufacture of a body of vegetation according to the invention for providing vegetation on roofs in thin strips, in a first step the body of vegetation is first unrolled flat on a film which is secure against root penetration; in a second step, the body of vegetation is filled with substrate and plant material capable of germination, and looked after in gardening fashion; in a third step, the holes are provided by mechanical means through the body of vegetation into the underlay; and in a fourth step the body of vegetation rolled up and conveyed to the roof.

Advantageous with this process for the manufacture of the vegetation carrier according to the invention is that the holes are applied simply, rapidly, and economically in the bodies of vegetation lying on the site. In this situation, the tensile reinforcement arranged if necessary between the structural matting and the underlay is perforated together with them.

In view of the fact that such bodies of vegetation are as a rule harvested by mechanical means, it is possible, if required, for the perforation to be carried out at the same time as the unrolling of the bodies of vegetation.

As an alternative, the process can be carried out with the third stage being left out, if a body of vegetation is used of which the underlay has already been provided with holes prior to its being laid on the film.

Further advantages and embodiments of the invention are described on the basis of an embodiment in the drawing, as well as in the description on the basis of an embodiment, and described in greater detail in the patent Claims.

The drawing shows an embodiment of a body of vegetation 10 according to the invention, in a longitudinal section. The body of vegetation 10 corresponds largely to a body of vegetation known from DE 197 40 682 A1, and features a structural matting 12, which is arranged above an underlay 14. In the embodiment shown, the structural matting 12 is represented as a looped mat 16 made of polyamide looped fabric, which is filled with substrate 32 and with plants 34. The substrate 32 in this situation is a substrate suitable for extensive roof vegetation coverage.

The underlay 14 in the embodiment shown is a dense cotton non-woven 30, which features a high water storage capacity. Arranged between underlay 14 and structural matting 12 is a polyester non-woven 28, which serves to accommodate tensile forces. Instead of the polyester non-woven 28, it is also possible for a PE lattice fabric or similar material to be used. The underside 26 of the polyester non-woven can be adhesively bonded, quilted, or connected in some other suitable manner to the underlay 14; and the polyester non-woven can be connected accordingly to the structural matting 12.

According to a matting known from DE 197 40 682 A1, the body of vegetation 10 features a first side edge area, not shown in the drawing, a first side edge, likewise not shown, a second side edge area 22, and a second side edge 24. These overlapping and underlapping areas serve to merge together two vegetation carriers 10, whereby, as a result of the rooting activity of the plants, these two overlapping vegetation carriers 10 are connected to one another.

The underlay 14, formed as a cotton non-woven 30, and the polyester non-woven 28, are provided with holes 18, 20. The holes 18, 20 are introduced into the underlay 14 and into the polyester non-woven 28 respectively by mechanical means, by what are referred to as "dibbers", by means of agricultural equipment during the horticultural care of the bodies of vegetation.

The effect of the holes 18, 20 is that the wind cannot attack the bodies of vegetation 10 over a flat surface area; namely, the sealing film which is, as a rule, arranged beneath the body of vegetation 10 on a roof is permanently secured to the roof, so that this film cannot be lifted by the wind suction. Accordingly, an underpressure finds no surface to attack; the body of vegetation 10 is secure in its position thanks to the holes 18, 20.

The invention claimed is:

1. A process for producing a vegetation sheet for covering a roof with a thin layer of vegetation comprising the following steps:
   (a) rolling out onto a film secure against root penetration a sheet comprising at least one underlay and a structural matting on the at least one underlay;
   (b) filling the sheet with substrate and germinatable plant material and cultivating the plant material;
   (c) working holes mechanically through the structural matting into the underlay; and
   (d) rolling up the sheet and transporting the sheet to the roof.

2. The process according to claim 1, wherein the underlay features a weight from 30 to 3,500 g/m$^2$.

3. The process according to claim 1, wherein the vegetation sheet is provided with 50 to 1,500 holes per square meter, whereby the holes in each case feature a diameter of 2 to 20 mm.

4. The process according to claim 1, wherein the number of holes is selected as a function of the roof height.

5. The process according to claim 1, wherein the structural matting is a looped mat.

6. The process according to claim 1, wherein the structural matting is a fiber mat.

7. The process according to claim 1, wherein the underlay is a dense needle non-woven.

8. The process according to claim 1, wherein the underlay is a polyester non-woven.

9. The process according to claim 1, wherein the underlay is a polypropylene non-woven.

10. The process according to claim 1, wherein the underlay is a dense cotton non-woven.

11. The process according to claim 1, wherein the underlay is a rock wool mat.

12. The process according to claim 1, wherein arranged between the structural matting and the underlay is reinforcing to accommodate tensile forces.

* * * * *